United States Patent
Chien

(10) Patent No.: US 7,345,691 B2
(45) Date of Patent: Mar. 18, 2008

(54) METHOD OF IMAGE PROCESSING AND ELECTRONIC DEVICE UTILIZING THE SAME

(75) Inventor: Chih-Chang Chien, Keelung (TW)

(73) Assignee: Winbond Electronics Corp., Hsinchu (TW)

( * ) Notice: Subject to any disclaimer, the term of this patent is extended or adjusted under 35 U.S.C. 154(b) by 77 days.

(21) Appl. No.: 11/000,981

(22) Filed: Dec. 2, 2004

(65) Prior Publication Data

US 2006/0120596 A1      Jun. 8, 2006

(51) Int. Cl.
G05B 13/02 (2006.01)
G09G 5/02 (2006.01)
G06G 7/00 (2006.01)
G06K 9/00 (2006.01)
G06N 3/02 (2006.01)
G06E 1/00 (2006.01)

(52) U.S. Cl. ............. 345/589; 345/549; 345/601; 358/518; 358/538; 382/162; 382/164; 700/48; 706/15

(58) Field of Classification Search ......... 345/589, 345/593, 597, 601, 602, 612, 536, 549, 555; 382/155–157, 162–167; 700/47–48; 706/15–16, 706/33; 358/515–519, 537–538; 348/453, 348/496, 577, 582, 599, 612

See application file for complete search history.

(56) References Cited

U.S. PATENT DOCUMENTS

| 5,638,190 A * | 6/1997 | Geist ..................... 358/500 |
| 6,480,299 B1* | 11/2002 | Drakopoulos et al. ....... 358/1.9 |
| 6,798,914 B1* | 9/2004 | Nanni et al. ............... 382/232 |
| 2005/0168596 A1* | 8/2005 | Ito et al. .................. 348/222.1 |

* cited by examiner

Primary Examiner—Wesner Sajous
(74) Attorney, Agent, or Firm—Birch, Stewart, Kolasch & Birch, LLP

(57) ABSTRACT

A method of image processing using neural networks. Images to be processed and displayed are received. Each image is divided into sections, each comprising pixels represented by color values. A neural network training procedure is executed for the sections to obtain color value tables and mapping tables. Each color value table comprises colors represented by the color values. The mapping tables record the relations between each pixel and the colors in the color value tables. The color value tables and the mapping tables are recorded in an electronic device for image display.

17 Claims, 5 Drawing Sheets

METHOD OF IMAGE PROCESSING AND ELECTRONIC DEVICE UTILIZING THE SAME

BACKGROUND

The invention relates to methods of image processing, and in particular to image processing using neural networks.

Generally, image pixels are represented by color values, such as RGB or HSV, for correct color display. If a colored image is to be displayed completely, storage of the color values of the colors must be very large. For example, in a true color system, each pixel of the image occupies 24 bits.

However, images may be displayed in certain electronic devices with image processing function, such as game machines, through a chip, such as a video chip. The storage space of the chip is usually limited. Thus, display of image colors completely with limited storage is important for electronic devices.

The mentioned problems can be partially resolved by an indexed image method utilizing a color palette containing colors for image display. Each color is represented by color values, such as RGB. Each pixel corresponds to one color in the color palette. When the images are displayed, the indices are first retrieved and corresponding colors obtained accordingly. The images are displayed according to the obtained colors.

A color palette 10 is shown on the left of FIG. 1, containing N colors, shown as 100, 102, 104, 106. Each color is represented by RGB color values. An image 12 with pixels is shown on the right. Each pixel records an index corresponding to the color palette 10. When image 12 is displayed, the indices are first retrieved. The corresponding color values are then obtained and the image displayed accordingly. In this indexed image method, only one color palette 10 and indices contained in the image 12 need be recorded, partially reducing the storage size.

The indexed image method has some drawbacks. First of all, if the color number of the color palette is too small, the image cannot be displayed properly. If the color number is large, the required storage size of the color palette increases.

SUMMARY

Methods of image processing resolves the displaying and storage problems are provided. An exemplary embodiment of the invention provides a method of image processing using neural networks. Images to be processed and displayed are received. Each image is divided into sections, each comprising pixels represented by color values. A neural network training procedure is executed for the sections to obtain color value tables and mapping tables. Each color value table comprises colors represented by the color values. The mapping tables record the relationships between each pixel and the colors comprised in the color value tables. The color value tables and the mapping tables are recorded in an electronic device for image display.

DESCRIPTION OF THE DRAWINGS

The present invention can be more fully understood by reading the subsequent detailed description and examples with references made to the accompanying drawings, wherein.

DESCRIPTION

Figure 1:
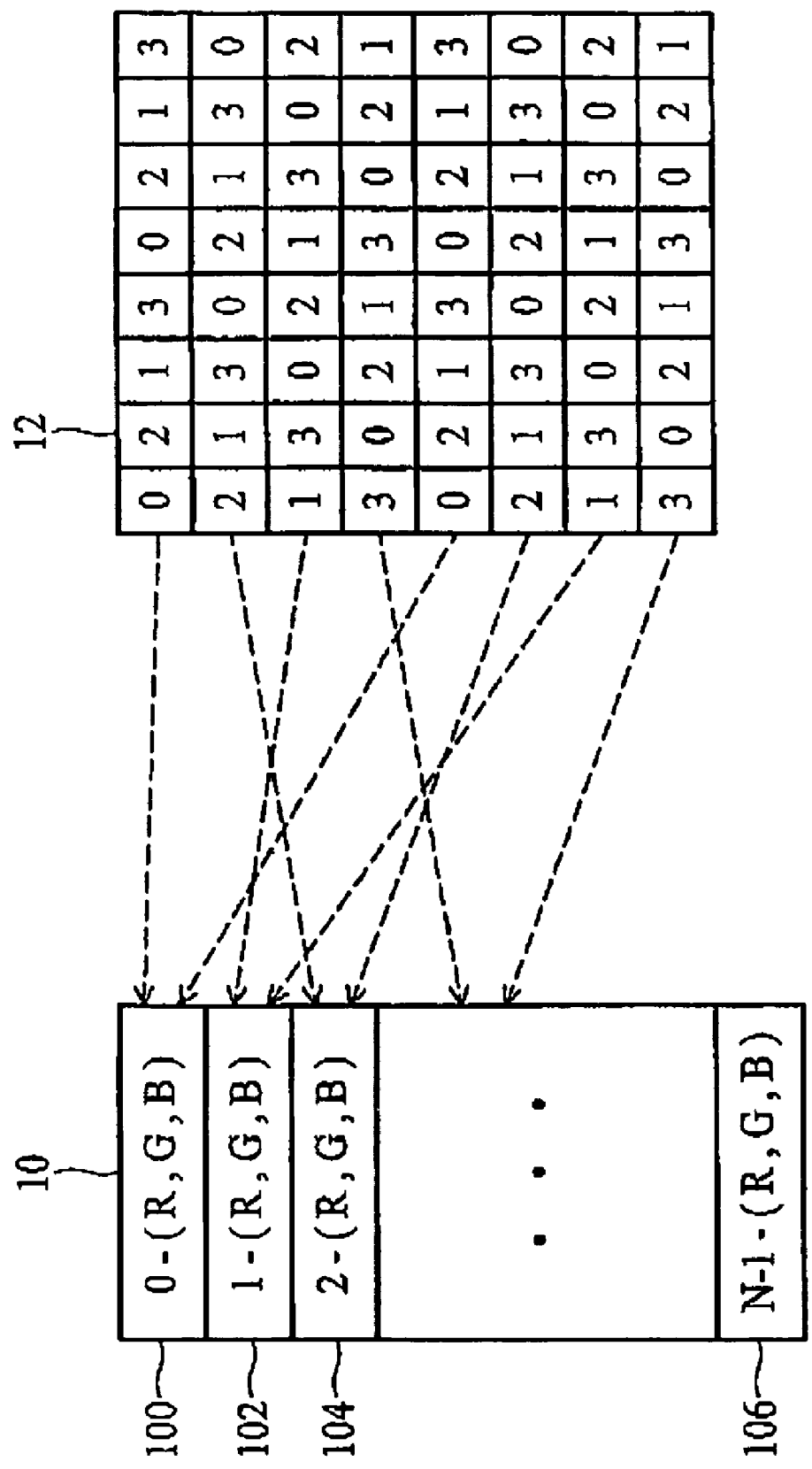
FIG. 1 is a diagram of a conventional indexed image method.
Figure 2:
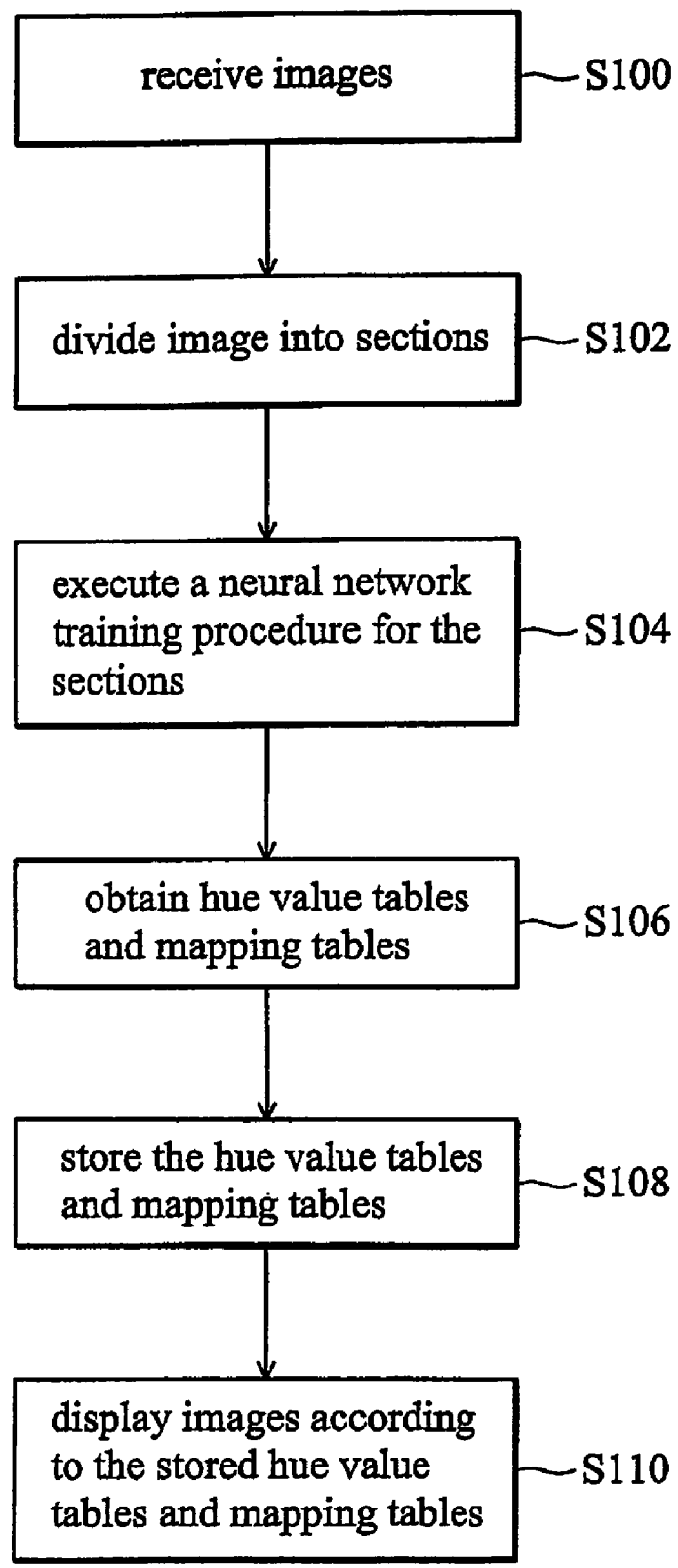
FIG. 2 is a flowchart of an embodiment of a method of image processing using neural networks of the present invention.

FIG. 2 is a flowchart of an embodiment of a method of image processing using neural networks. In some embodiments, images to be processed and displayed are received (step S100). Each is divided into sections (step S102), each of which comprises pixels represented by color values. A neural network training procedure is executed for the sections (step S104) to obtain color value tables and mapping tables (step S106). Each color value table comprises colors represented by the color values. The mapping tables record the relationships between each pixel and the colors in the color value tables. The obtained color value tables and the mapping tables can be stored in an electronic device (step S108), providing display of the images according to the stored color value tables and mapping tables (step S110).

Figure 3:
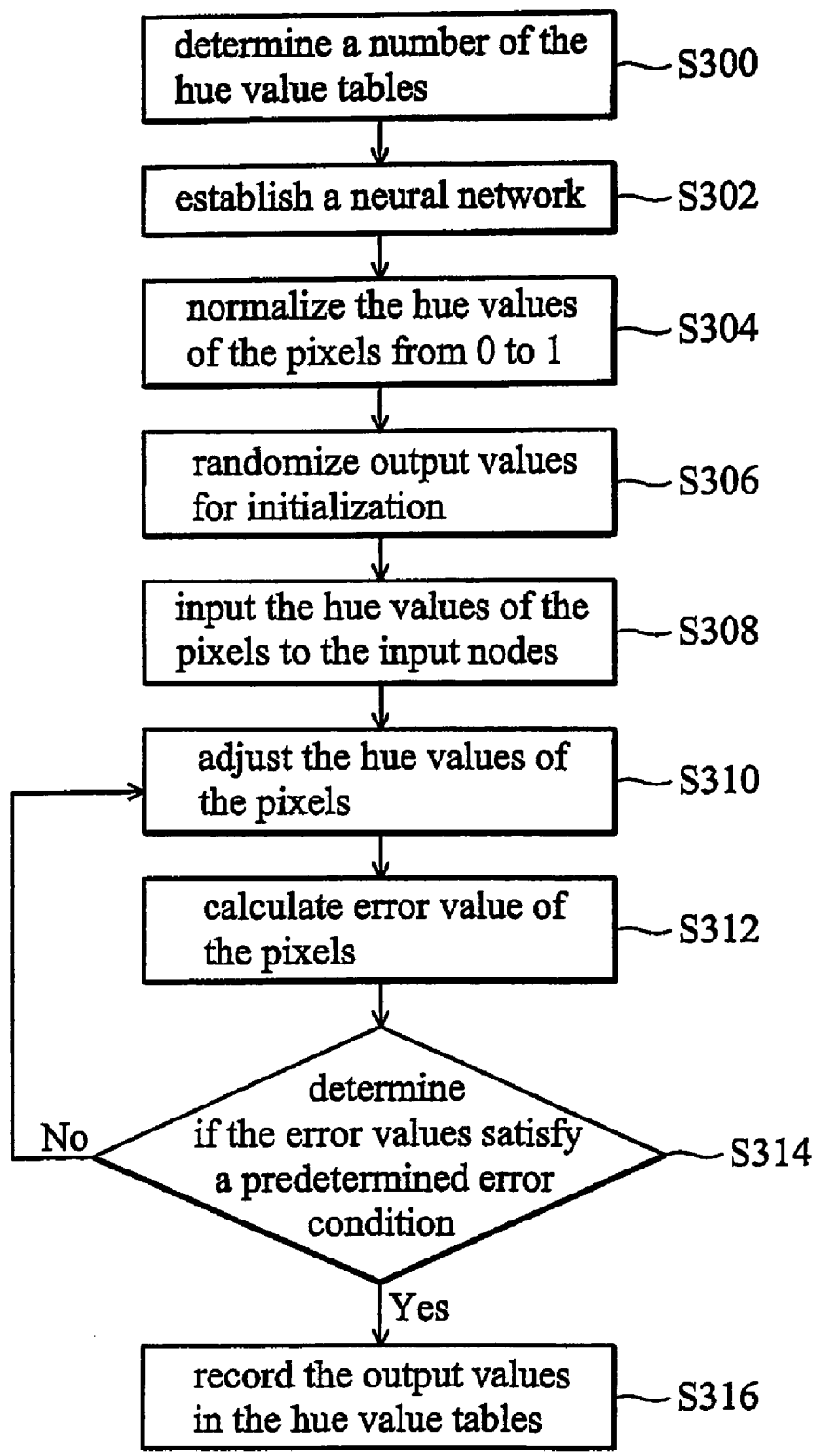
FIG. 3 is a flowchart of an embodiment of a neural network training procedure of the present invention.

As shown in FIG. 3, in the neural network training procedure, a number of the color value tables is determined (step S300) and a neural network established (step s302). The neural network contains child neural networks, each corresponding to one color value table.

Figure 4:
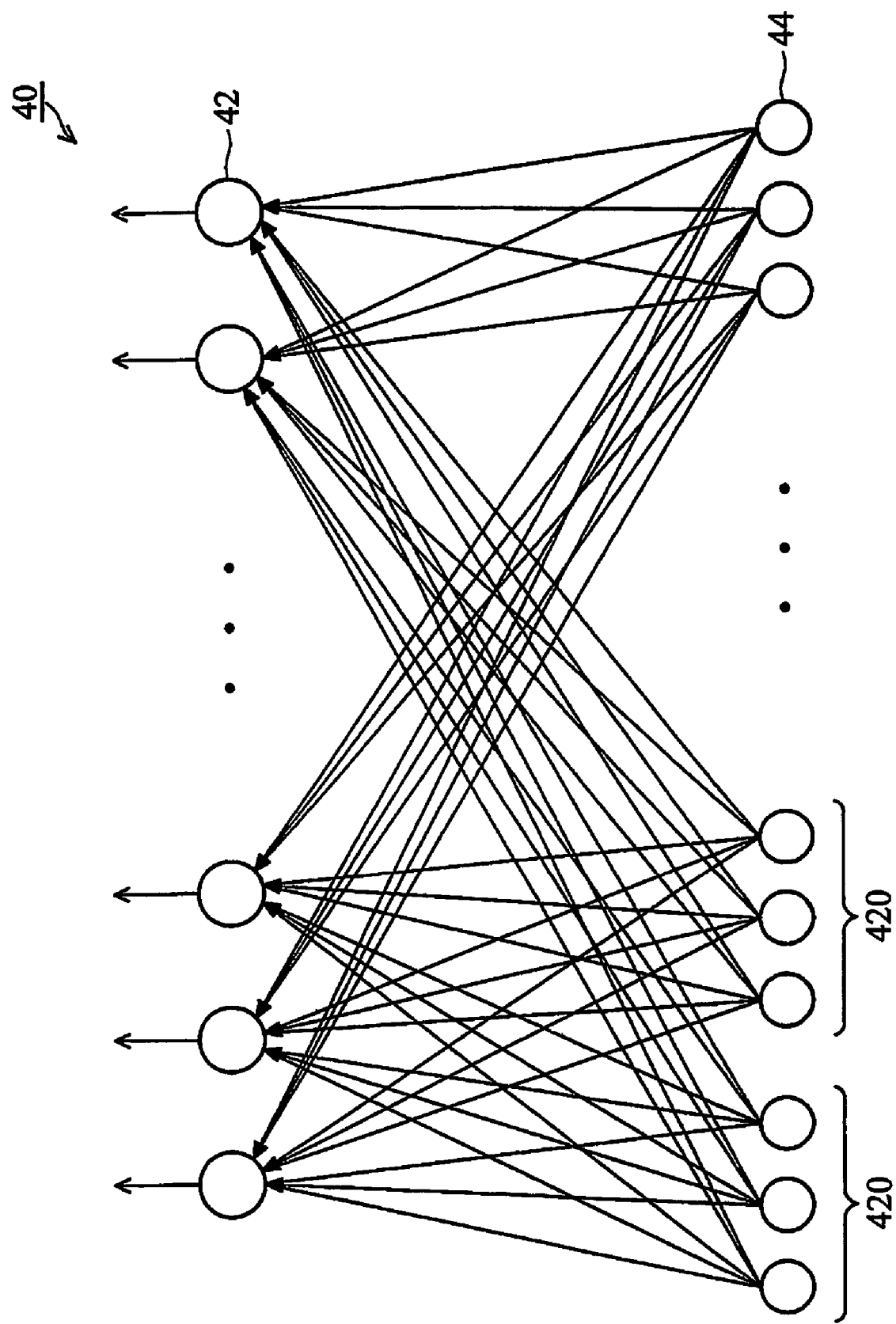
FIG. 4 is a diagram of an embodiment of a neural network of the present invention.

FIG. 4 is a diagram of an embodiment of a neural network, containing child neural networks 40 corresponding to color value tables. Each child neural network 40 comprises an output layer 42 and input layer 44. The output layer 42 contains output nodes as the number of the colors in the corresponding color value table. The input layer 44 contains input node sets 420 as the number of the pixels in each section. Each input node set 420 has input nodes as the number of the color values. Thus, for a child neural network, the number of the input nodes is (pixel number)×(color value number). If a section contains 64 pixels, that is, 8×8 pixels, each represented by RGB three color values, the total number in one section is 64×3=192 input nodes.

In FIG. 3, after the neural network is established, the neural network training procedure can be executed. The color values of the pixels contained in each section are normalized from 0 to 1 (step S304). Output values are randomized for initialization (step S306).

The color values of the pixels contained in each section are input to the input nodes (step S308). The color values of the pixels are adjusted to obtain the output values (step S310). The adjustment is accomplished by:

$$\Delta r = \frac{\partial E}{\partial r} = -\frac{R - r_t}{3 \times E}, r_{t+1} = r_t + \mu \times \Delta r$$

$$\Delta g = \frac{\partial E}{\partial g} = -\frac{G - g_t}{3 \times E}, g_{t+1} = g_t + \mu \times \Delta g$$

$$\Delta b = \frac{\partial E}{\partial b} = -\frac{B - b_t}{3 \times E}, b_{t+1} = b_t + \mu \times \Delta b$$

In which E is an error formula, R, G, and B are color values of the pixels and $r_t$, $g_t$, and $b_t$ are output values, t is calculation count and μ an adjustment rate parameter.

Error value of the pixels contained in each section is calculated (step S312) by:

$$E = \sqrt{\frac{(R-r_t)^2 + (G-g_t)^2 + (B-b_t)^2}{3}}$$

Wherein E is the error value, R, G, and B are the color values of the pixels, and $r_t$, $g_t$, and $b_t$ are the output values. While here, Mean Square Error (MSE) is used as the error formula, other error evaluation methods may be adopted.

It is then determined if the error values satisfy a predetermined error condition (step S314). If so, the output values are recorded in the color value tables (step S316). If not, the adjustment and the calculation are repeated (step S310, S312).

The adjustment and error formulas are changeable. Adjustment uses actual colors as the desired goal to train the neural network. The neural network can learn by training to adjust the output values. If the difference between the output values and the desired goal is within an acceptable range, the output values are recorded in color value tables. The corresponding relationships of the input nodes and the output nodes are recorded in the mapping tables, that is, the relationships between the pixels and the colors of the color value tables. Additionally, the predetermined error condition can be set according to the actual requirement. If the adjustment satisfies the predetermined error condition, training is terminated. The adjustment rate parameter, affecting the adjustment speed, can also be determined according to actual requirements.

For a pixel, the error value is calculated in the input nodes according to the color values. For a section, the error value is an average of the error values of the pixels contained therein. For an image, the error value is an average of the error values of the sections contained therein. The stored color value tables are based on the child neural networks having the minor error.

Figure 5:
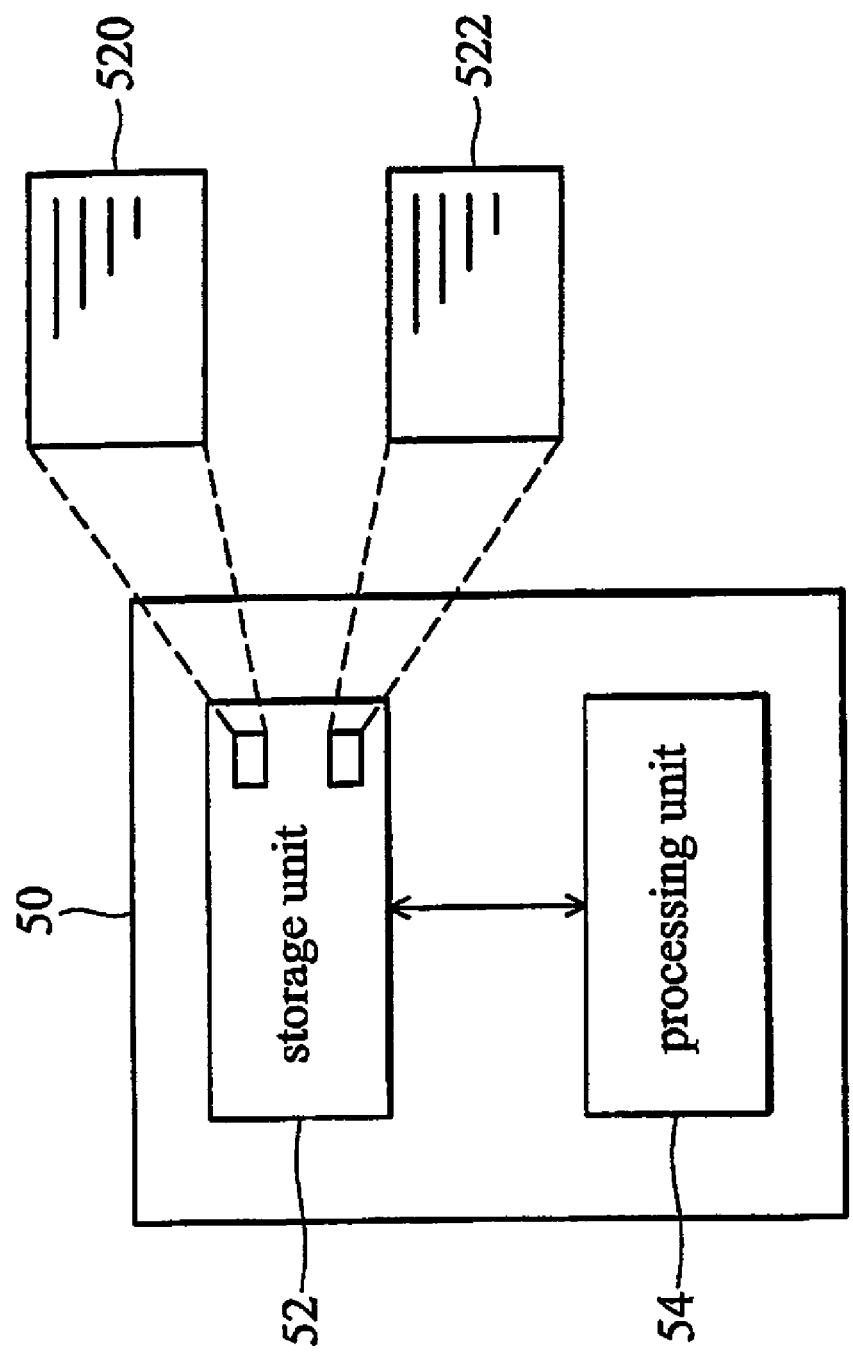
FIG. 5 is a diagram of an embodiment of an electronic device with image processing using neural networks of the present invention.

FIG. 5 is a diagram of an embodiment of an electronic device with image processing using neural networks, in which, an electronic device 50 with image processing function using neutral networks comprises a storage unit 52 and a processing unit 54.

The storage unit 52 stores color value tables 520 and mapping tables 522 which are obtained by a neural network training procedure. The processing unit 54, coupled to the storage unit 52, displays images according to the color value tables 520 and mapping tables 522. The storage unit 52 can be implemented as a chip or integrated into the processing unit 54. The processing unit 54 can be a central processing unit or a controller.

Neural network training is executed by a training module, executing steps as shown in FIGS. 2 and 3. The training module can be implemented in a computer.

As an example, referring to FIG. 2 and FIG. 3, if an image, containing 256×256 pixels, is to be processed and displayed, each pixel is represented by RGB three color value, each color value occupying one bit. Thus, conventionally, the storage size for the image is 256×256×3×8=157864 bits.

The image is divided into sections of 8×8 pixels (step S102). A neural network training procedure is executed for the sections (step S104) to obtain four color value tables and 1024 mapping tables (step S106). Each color value table contains 16 colors, i.e. color value combinations. The obtained color value tables and the mapping tables are stored in an electronic device (step S108). The storage size is 4×(16×3×8)+1024×(2+8×8×4)=265728 bits. Comparing to the conventional method, the storage size of the present inventive method over the conventional one is reduced to 16.9%. The electronic device can display the images according to the stored color value tables and mapping tables (step S110).

As shown in FIG. 3, in the neural network training, a number of the color value tables is determined (step S300). Here, the number of the color value tables is 4 and each color value table contains 16 colors, i.e. color value combinations.

The neural network contains child neural networks corresponding to the color value tables. Each child neural network comprises an output layer and an input layer. The output layer contains 16 output nodes as the number of the colors in a color value table. The input layer contains 64 input node sets as the number of pixels in each section. Each input node set has 3 input nodes.

After the neural network is established (step S302), neural network training is executed. First, the color values of pixels contained in each section are normalized from 0 to 1 (step S304) and output values are initialized by randomizing (step S306).

Next, the color values of the pixels contained in each section are input to the input nodes (step S308). The color values of the pixels are adjusted to obtain the output values (step S310). The adjustment is accomplished by:

$$\Delta r = \frac{\partial E}{\partial r} = -\frac{R-r_t}{3 \times E}, r_{t+1} = r_t + \mu \times \Delta r$$

$$\Delta g = \frac{\partial E}{\partial g} = -\frac{G-g_t}{3 \times E}, g_{t+1} = g_t + \mu \times \Delta g$$

$$\Delta b = \frac{\partial E}{\partial b} = -\frac{B-b_t}{3 \times E}, b_{t+1} = b_t + \mu \times \Delta b$$

Here, E is an error formula. In this example, MSE is selected as the error formula. R, G, B are color values of the pixels, $r_t$, $g_t$, $b_t$ are output values, t is calculation count, and μ is a adjustment rate parameter. In this example, μ=0.005.

An error value of the pixels contained in each section is calculated (step S312). The error values are calculated by:

$$E = \sqrt{\frac{(R-r_t)^2 + (G-g_t)^2 + (B-b_t)^2}{3}}$$

Here, E is the error value, R, G, B are the color values of the pixels, and $r_t$, $g_t$, $b_t$ are the output values. The predetermined error condition is 0.035.

The adjustment and the calculation are repeated until the error values satisfy the predetermined error condition. Thus, if the error values are less than 0.035 (step S314), training is terminated and the output values are recorded in the color value tables (step S316).

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method of image processing using neural networks, comprising:

receiving at least one image;

dividing each image into at least one section, each comprising pixels represented by at least one color value; and executing a neural network training procedure for the at least one section to obtain at least one color value table and at least one mapping table, wherein each color value table comprises colors represented by the color values, and the at least one mapping table records the relationships between each pixel and the colors comprised in the at least one color value table, wherein the neural network training procedure comprises:

determining a number of the at least one color value table; and establishing a neural network containing at least one child neural network, wherein each child neural network corresponds to one color value table and comprises an output layer and an input layer, the output layer contains output nodes as the number of colors contained in the corresponding color value table, the input layer contains input node sets as the number of the pixels contained in each section, and each input node set has input nodes as the number of the color values.

2. The method of image processing using neural networks as claimed in claim 1, further comprising:

storing the at least one color value table and the at least one mapping table in an electronic device; and the electronic device displaying the images according to the at least one color value table and the at least one mapping table.

3. The method of image processing using neural networks as claimed in claim 1, wherein the neural network training procedure comprises:

inputting the color values of the pixels contained in each section to the input nodes;

adjusting the color values of the pixels to obtain at least one output value;

calculating an error value of the pixels for each section according to the color values and the output values, and outputting the error values by the output nodes;

recording the output values in the at least one color value table if the error values satisfy a predetermined error condition; and repeating the adjustment and the calculation if the error values do not satisfy the predetermined error condition.

4. The method of image processing using neural networks as claimed in claim 3, wherein error values are calculated by:

$$E = \sqrt{\frac{(R-r_t)^2 + (G-g_t)^2 + (B-b_t)^2}{3}}$$

wherein E is the error value, R, G, B are the color values of the pixels, $r_t$, $g_t$, $b_t$ are the output values.

5. The method of image processing using neural networks as claimed in claim 4, wherein adjustment is accomplished by:

$$\Delta r = \frac{\partial E}{\partial r} = -\frac{R-r_t}{3 \times E}, r_{t+1} = r_t + \mu \times \Delta r$$

$$\Delta g = \frac{\partial E}{\partial g} = -\frac{G-g_t}{3 \times E}, g_{t+1} = g_t + \mu \times \Delta g$$

$$\Delta b = \frac{\partial E}{\partial b} = -\frac{B-b_t}{3 \times E}, b_{t+1} = b_t + \mu \times \Delta b$$

wherein E is the error formula, R, G, B are the color values of the pixels, $r_t$, $g_t$, $b_t$ are the output values, t is calculation count, μ is an adjustment rate parameter.

6. The method of image processing using neural networks as claimed in claim 3, wherein in the input step the color value of the pixels are further normalized 0 to 1.

7. The method of image processing using neural networks as claimed in claim 3, wherein in the input step the output values are further randonmized for initialization.

8. An electronic device with image processing function using a neutral network, comprising:

a storage unit for storing at least one color value table and at least one mapping table, wherein the at least one color value table, and the at least one mapping table are obtained by a neural network training procedure, wherein the at least one mapping table records the relationships between each pixel and the colors comprised in the at least one color value table, wherein the neural network procedure further comprise:

determining number of the at least one color value table; and establishing a neural network containing at least one child neural network, wherein each child neural network corresponds to one color value table and comprises an output layer and an input layer, the output layer contains output nodes as the number of colors contained in the corresponding color value table, the input layer contains input node sets as the number of the pixels contained in each section, and each input node set has input nodes as the number of the color values; and a processing unit, coupled to the storage unit, for displaying at least one image according to the least one color value table and the at least one mapping table.

9. The electronic device with image processing using a neutral network as claimed in claim 8, wherein the neural network training procedure is executed by a training module, and comprises:

receiving at least one image;

dividing each image into at least one section, wherein each section comprises pixels represented by at least one color value; and obtaining at least one color value table and at least one mapping table, wherein each color value table comprises colors represented by the color values, and the at least one mapping table records the relations between each pixel and the colors comprised in the at least one color value table.

10. The electronic device with image processing using a neutral network as claimed in claim 8, wherein the neural network procedure further comprises:

inputting the color values of the pixels contained in each section to the input nodes;

adjusting the color values of the pixels to obtain at least one output value;

calculating an error value of the pixels for each section according to the color values and the output values, and outputting the error values by the output nodes;

recording the output values in the at least one color value table if the error values satisfy a predetermined error condition; and repeating the adjustment and the calculation if the error values do not satisfy the predetermined error condition.

11. The electronic device with image processing using a neutral network as claimed in claim 10, wherein the error values are calculated by:

$$E = \sqrt{\frac{(R-r_t)^2 + (G-g_t)^2 + (B-b_t)^2}{3}}$$

wherein E is the error value, R, G, B are the color values of the pixels, $r_t$, $g_t$, $b_t$ are the output values.

12. The electronic device with image processing using a neutral network as claimed in claim 11, wherein the adjustment is accomplished by:

$$\Delta r = \frac{\partial E}{\partial r} = -\frac{R-r_t}{3 \times E}, r_{t+1} = r_t + \mu \times \Delta r$$

$$\Delta g = \frac{\partial E}{\partial g} = -\frac{G-g_t}{3 \times E}, g_{t+1} = g_t + \mu \times \Delta g$$

-continued $$\Delta b = \frac{\partial E}{\partial b} = -\frac{B-b_t}{3 \times E}, b_{t+1} = b_t + \mu \times \Delta b$$

wherein E is the error formula, R, G, B are the color values of the pixels, $r_t$, $g_t$, $b_t$ are the output values, t is calculation counts, $\mu$ is a adjustment rate parameter.

13. The electronic device with image processing using a neutral network as claimed in claim 10, wherein the training module further normalizes the color values of the pixels from 0 to 1.

14. The electronic device with image processing using a neutral network as claimed in claim 10, wherein the training module further randomizes the output values for initialization.

15. The electronic device with image processing using a neutral network as claimed in claim 9, wherein the training module is a computer.

16. The electronic device with image processing using a neutral network as claimed in claim 9, wherein the storage unit is a chip.

17. The electronic device with image processing using a neutral network as claimed in claim 9, wherein the processing unit is a central processing unit or a controller.

* * * * *